No. 717,858. PATENTED JAN. 6, 1903.
C. F. IGELMANN.
BAKER'S OVEN.
APPLICATION FILED AUG. 4, 1902.
NO MODEL. 3 SHEETS—SHEET 1.

Witnesses, Inventor,
Charles F. Igelmann,
By Joseph A. Minturn,
Attorney.

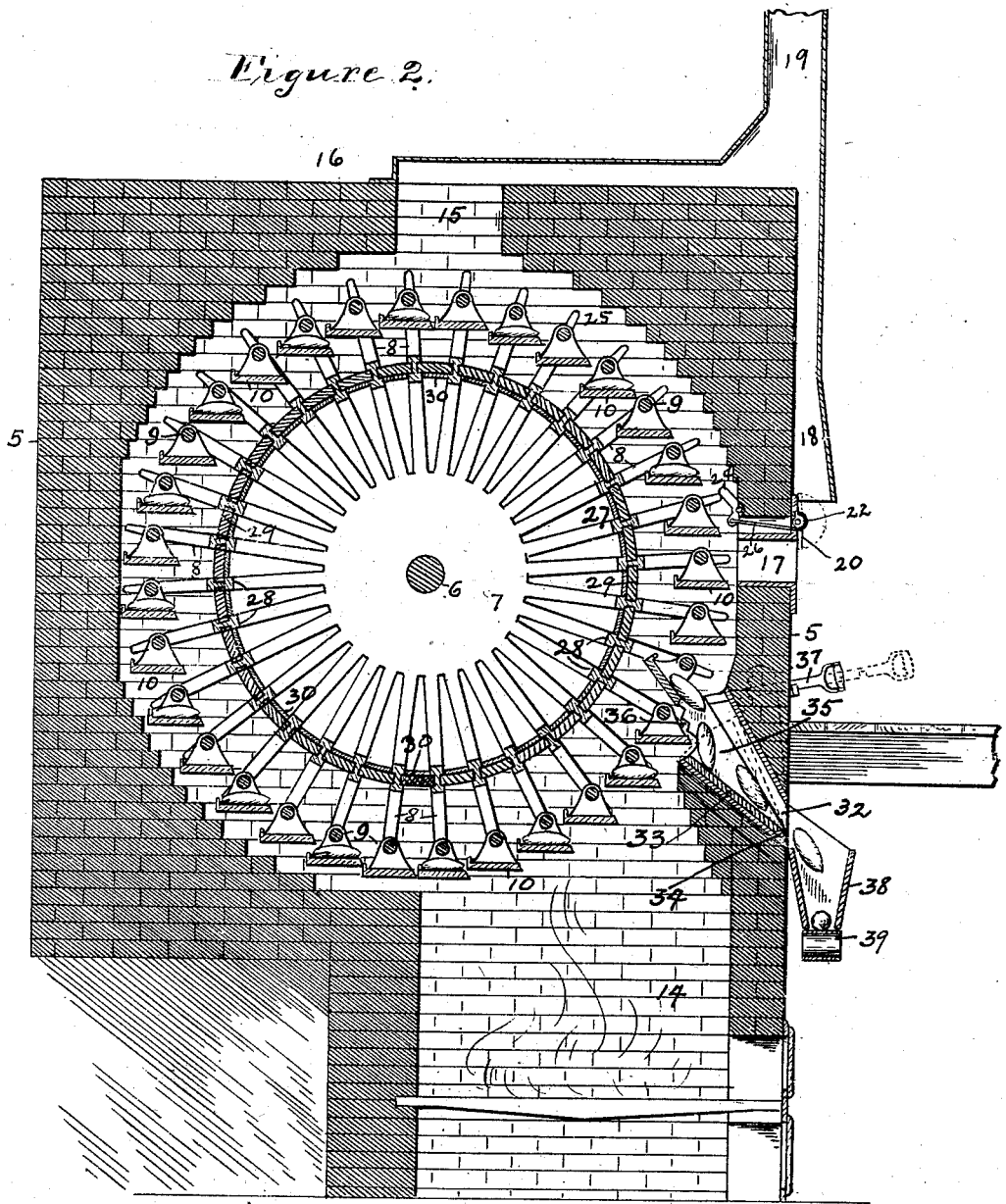

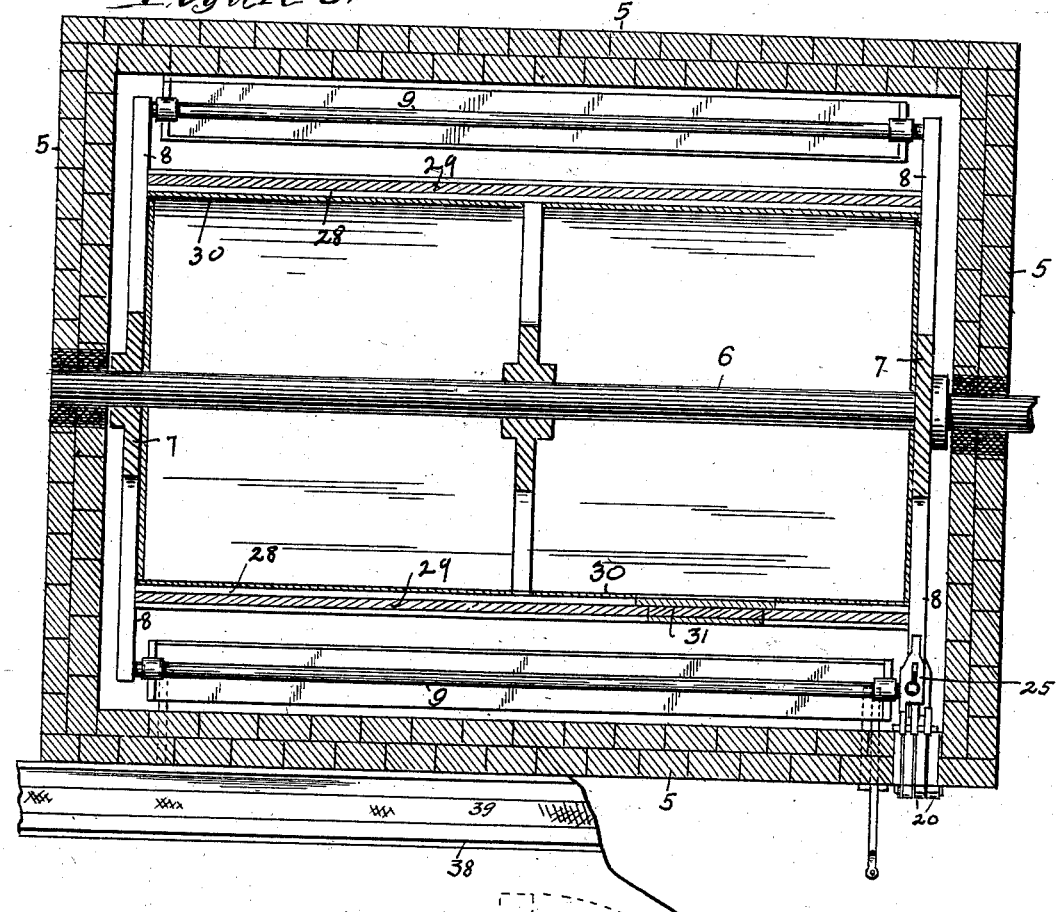
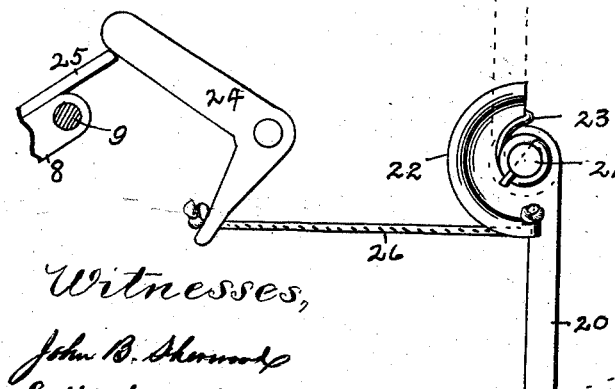

UNITED STATES PATENT OFFICE.

CHARLES F. IGELMANN, OF INDIANAPOLIS, INDIANA.

BAKER'S OVEN.

SPECIFICATION forming part of Letters Patent No. 717,858, dated January 6, 1903.

Application filed August 4, 1902. Serial No. 118,299. (No model.)

*To all whom it may concern:*

Be it known that I, CHARLES F. IGELMANN, a citizen of the United States, residing at Indianapolis, in the county of Marion and State of Indiana, have invented certain new and useful Improvements in Bakers' Ovens, of which the following is a specification.

This invention relates to improvements in reel-ovens for bakers' use; and the object is, first, to better utilize the heat required to do the baking, so as to economize in fuel by excluding the heat from the middle of the reel and confining it to the outer portions where the pans are carried; second, to provide means for automatically discharging the baked product, and, third, to provide an indicator which will designate on the outside of the oven the particular pan positioned on the inside opposite the inlet-opening ready to receive the unbaked dough.

The invention consists of certain details of construction, which will be hereinafter fully described, and pointed out in the claims, and are fully illustrated in the accompanying drawings, in which—

Figure 1:
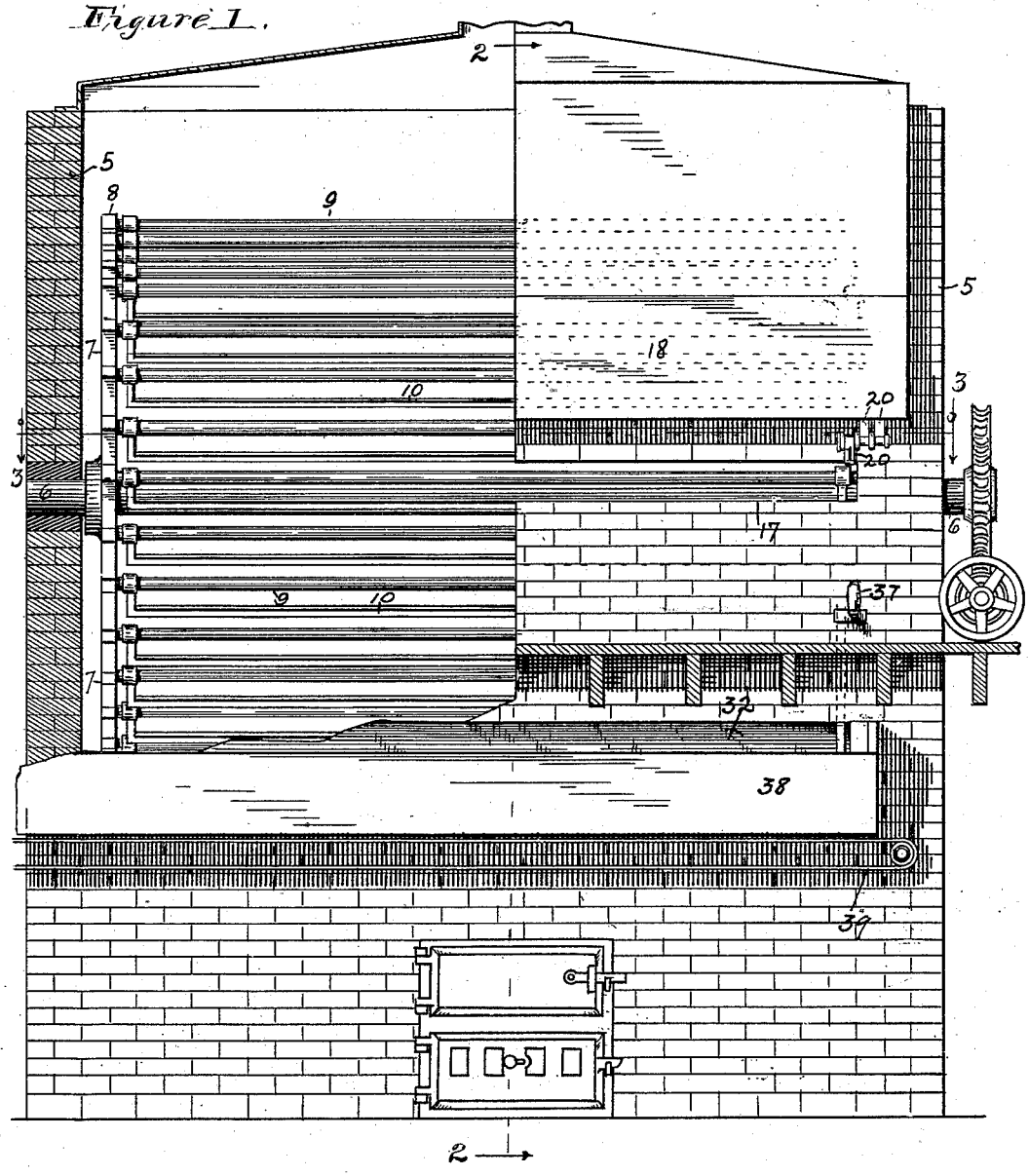

Figure 1 is a front elevation of my improved oven, showing one side thereof broken away and partially sectioned to reveal the inside construction; Fig. 2, a vertical section on the line 2 2 of Fig. 1; Fig. 3, a horizontal section on the line 3 3 of Fig. 1; Fig. 4, a detail in side elevation of the indicator mechanism, and Fig. 5 a detail in cross-section of the shelf.

Like reference characters indicate like parts throughout the several views of the drawings.

Figure 5:
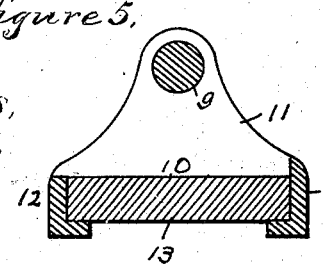

5 represents the four walls of the oven, made of brick in the usual manner. The side walls have suitable bearings, in which the reel-shaft 6 is mounted. Mounted on this shaft are the spiders 7, which may have any desired number of radial arms 8, here shown as thirty-six in number, between the opposite outside pairs of which are horizontal shafts 9, from which the swinging shelves 10 are suspended. The shelves will assume a horizontal position by gravity and will retain that position throughout the entire travel of the reel except when purposely tipped by extraneous means to discharge the baked product. The shelves may be of iron, as shown in Fig. 2, or where a clay surface is required, as in "hearth-baking," the end suspension-plates 11 will be connected by the angle-bars 12 12 and the earthen slabs 13 to form the shelf deposited between the angle-bars, as shown in Fig. 5.

Below the reel is the fire-box 14, from which the heat rises and passing through the reel escapes through the opening 15 in the brick top 16.

The front of the oven has the inlet-opening 17, through which the dough to be baked is introduced either in pans which are deposited upon the shelf which is at that time opposite said opening, or the dough, if desired, may be deposited directly upon the shelf. This depends upon the kind of baking that is to be done. Heat escaping through the opening in the oven enters the chute 18, which empties into the chimney 19.

In some kinds of baking, as where heavy masses of dough are to be baked, the weight is such as to overbalance the reel when every shelf is filled to such an extent as to interfere with the rotation of the reel, and to prevent overloading it is necessary to let every other shelf go empty, or perhaps to only fill every third shelf. In order that the baker may know which shelf to load, I provide an indicator or marking device comprising a series of plates 20, located outside of the oven where they can be seen. These plates are hinged at one of their ends and stand normally above their hinges with their flat sides against the wall of the oven. The inner sides of these plates (in this normal position) have numerals "1 2 3," and means is provided whereby the plates are successively lowered by the arms of the reel-spider, so as to expose the number on its back. As soon as the spider-arm passes the released plate will be returned by a spring. 21 (see Fig. 4) represents the pintle or shaft on which the plates 20 are hinged. Each plate has a half-pulley 22, and the plate is held in normal position, as shown in dotted lines in the drawings, by the spring 23.

24 is a bell-crank lever pivotally secured to the inner wall of the oven in the path of a projecting arm 25 from the spider-arm. The lower end of lever 24 is connected by the cable 26 with the half-pulley 22. The operation is evident from the drawings. The arm 25 is removable and adjustable on the spider-arm, whereby the bell-crank of any one of the three indicator-plates may be actuated by it. As in Fig. 3, should it be desired to change this arm so it will strike the bell-crank for the outside plate instead of striking that of the inside plate as it is now set I have simply to turn the arm bottom side up, and to strike the middle bell-crank I turn the arm end for end.

In order to economize heat, and consequently fuel, I exclude the heat from the large middle volume of the reel by means of the cylindrical wall 27.

Channel-bars 28 are bolted between the outside spider-arms, and fire-brick slabs 29 are seated in the grooves of the channel-bars, as shown in Fig. 2. Inside this is a lining of asbestos 30. This outside layer of fire-brick furnishes a soft radiation of heat, which is adjacent to the pans and is most desirable, while the asbestos prevents the conduction of heat to the interior. A manhole 31 allows of entrance for repairs and cleaning.

The baked product may be removed through the same opening by which the dough was introduced to the oven; but preferably I will remove it automatically in the following manner:

32 is a second opening below the first or inlet opening. Its lower wall is built out into the oven below the sweep of the reel, as shown in Fig. 2. It has a false bottom 33, which is hinged at its lower end at 34, whereby it may be folded or raised, as shown in dotted lines, to close the opening when desired. At each end of said false bottom are the integral right-angled extensions 35, which extend into the path of the swinging shelves of the reel, so as to tip the latter and dump their contents, but not until after the shelf has traveled into position over the bottom 33, whereby the latter will arrest the dumped product and direct it outside of the oven through the opening 32. The inner edges of ends 35 have the notches 36, which give a jarring movement to the shelf passing over them, thereby loosening the baked goods thereon and causing said goods to discharge with more certainty. By means of the lever 37 the bottom 33 and ends 35 may be drawn up out of the path of the reel and pans. The baked goods may be deposited into the hopper-trough 38 under the outlet 33 and carried by endless belt or carrier 39 to any desired locality of the bakery.

Having thus fully described my invention, what I claim as new, and wish to secure by Letters Patent of the United States, is—

1. A reel for baking-ovens having a central drum with longitudinal I-beams and an earthen exterior surface supported by said beams.

2. In a reel baking-oven, a revolving reel having shelves to receive the dough, indicators on the outside of the oven having suitable characters and means for actuating the indicators by the movement of the reel.

3. A baker's oven, a reel rotating therein, swinging shelves carried by said reel, a discharge-opening through the oven-wall, means for closing the discharge-opening and means controlled by said closing device for tilting the shelves into a position oblique to the horizontal as they pass said opening to cause them to discharge their contents therethrough.

4. A baker's oven, a reel rotating therein, swinging shelves carried by said reel, a discharge-opening through the oven-wall, means operated outside of the oven for closing said discharge-opening, and projections in the path of said shelves connected with and operated by said closing device to cause the shelves to tilt and dump their contents through said opening.

5. A baker's oven, a reel rotating therein, swinging shelves carried by said reel, a discharge-opening through the oven-wall, projections in the path of said shelves to cause them to tilt and dump their contents through said opening and means for jarring the tilted shelves to facilitate the discharge.

6. A baker's oven, a reel rotating therein, swinging shelves carried by said reel, a discharge-opening through the oven-wall, means for tilting the shelves when opposite the opening and means for jarring the tilted shelves.

In witness whereof I have hereunto set my hand and seal, at Indianapolis, Indiana, this 28th day of July, A. D. 1902.

CHARLES F. IGELMANN. [L. S.]

Witnesses:
JOSEPH A. MINTURN,
S. MAHLON UNGER.